Nov. 28, 1950 M. J. ZIMMER 2,531,717
PRESSURE COOKER

Filed June 11, 1945 3 Sheets-Sheet 1

MYRON J. ZIMMER
INVENTOR.

BY
ATTORNEY.

Nov. 28, 1950     M. J. ZIMMER     2,531,717
PRESSURE COOKER

Filed June 11, 1945     3 Sheets-Sheet 2

MYRON J. ZIMMER
INVENTOR.

BY
ATTORNEY.

Nov. 28, 1950  M. J. ZIMMER  2,531,717
PRESSURE COOKER

Filed June 11, 1945  3 Sheets-Sheet 3

MYRON J. ZIMMER
INVENTOR.

BY
ATTORNEY

Patented Nov. 28, 1950

2,531,717

UNITED STATES PATENT OFFICE 2,531,717

PRESSURE COOKER

Myron J. Zimmer, Wood Dale, Ill., assignor to Ekco Products Company, Chicago, Ill., a corporation of Illinois Application June 11, 1945, Serial No. 598,725

8 Claims. (Cl. 220—25)

1

This invention relates to improvements in pressure cookers of the type having a substantially elliptical opening in its top portion through which contents of the receptacle may be admitted to or removed therefrom with a sealing surface on the inner side of said top portion surrounding said opening for sealing engagement with the rim of a cover larger than said opening when said cover is in a predetermined position of rotation about a central axis and movable through the widest part of said opening toward and away from a position in sealed engagement with said sealing surface when rotated about said axis through an arc of 90 degrees away from said predetermined position and tilted.

In pressure cookers of this type the cover is held in engagement with the internal sealing surface surrounding the receptacle opening by means of an overhead supporting element applicable to the exterior of the receptacle in a predetermined position across said opening, to which the cover is adjustably connected for movement from an initial spaced position relative to said support wherein the rim of the cover is in sealed engagement with said sealing surface while said support is operatively seated across the receptacle opening to an advanced spaced position wherein the cover and support are at a distance apart compatible with the clearance space required therebetween for tilting and lifting the cover through the receptacle opening.

It is an object of this invention to provide a cooker of this type wherein resilient means cooperate with said cover and said supporting element to normally urge the cover and support toward said initial spaced position.

It is a further object of this invention to provide a cooker of this type wherein the cover may be rotated about said connection as an axis from an initial rotated position wherein the rim of the cover is in sealing engagement with the sealing surface surrounding the receptacle opening to an advanced rotated position 90 degrees away from said initial rotated position, while said support is in fixed position across said opening.

Another feature of this invention is the provision of locking means cooperating between said supporting member and the connection between the cover and said supporting member to hold the cover and support in advanced spaced position when said cover is in advanced rotated position.

With the above and other objects in view, as will be apparent, this invention consists in the construction, combination and arrangement of

2 parts all as hereinafter more fully described, claimed and illustrated in the accompanying drawing, wherein:

Figure 1:
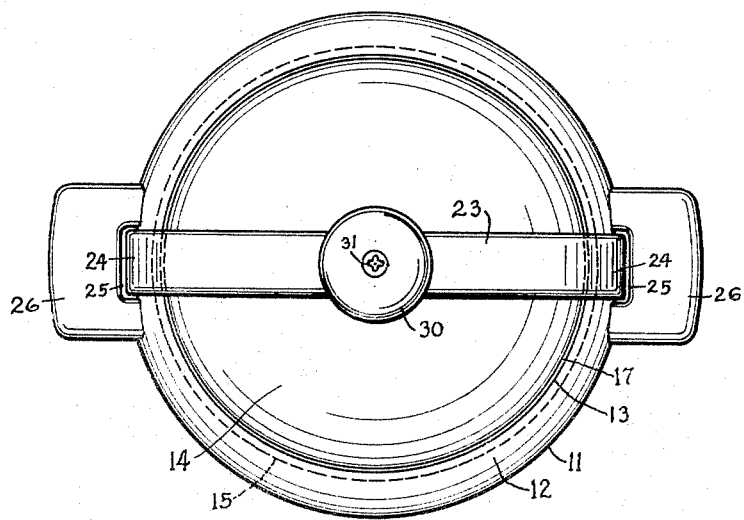
Fig. 1 is a top plan view of a pressure cooker embodying this invention.
Figure 2:
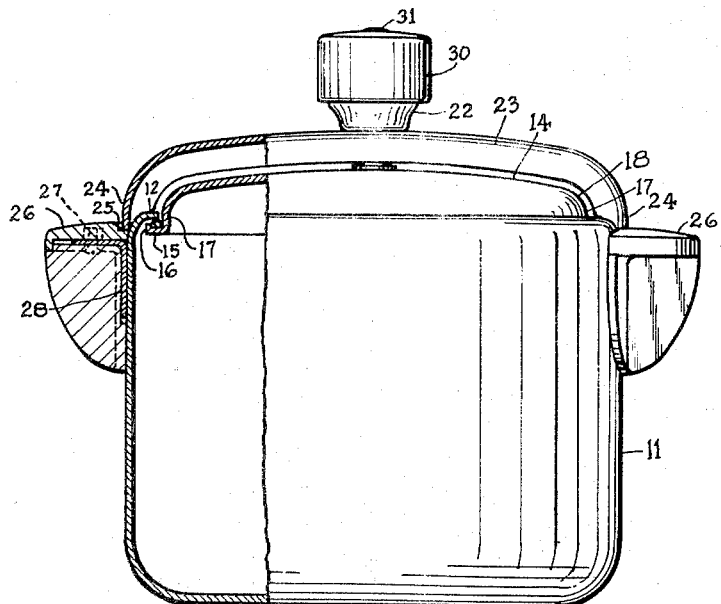
Fig. 2 is a side elevation thereof with a portion in section.

A receptacle or container typifying the present invention, comprises, as clearly shown in Figs. 1 and 2 of the drawings, a body having a flat circular bottom 10 and a cylindrical side wall 11 extending upwardly from the perimeter of said bottom. The upper limits of the side wall 11 terminate in an inwardly extending flange 12 having its edge trimmed as at 13 to define a substantially elliptical opening or mouth in the top of the receptacle body. The size and shape of the receptacle may be varied as desired.

The opening thus provided in the top of the receptacle is adapted to be closed by a cover 14, preferably of stamped sheet metal construction, having a peripheral rim 15 and an upturned lip 16 at the outer edge of the rim arranged to support a gasket of suitable material in sealed engagement with the inwardly facing surface of the flange 12 surrounding the vessel opening. The dimension of the cover 14 and the rim 15 is such that the same is readily insertable through the vessel opening when moved toward and away from a position wherein said rim 15 is in sealed engagement with the flange 12 by passing the cover lengthwise of its longest dimension through the widest part of the opening. A relatively steep wall 17 extending upwardly from the inner edge of the cover rim 15 cooperates with the edge 13 of the receptacle opening to prevent the rim of the cover from accidental rotation away from a position in sealed engagement with the flange 12. An inwardly and upwardly curved juncture zone through which the wall 17 merges with the central upper face portion of the cover cooperates with the edge 13 to slidably guide the cover upwardly and inwardly toward a position in sealing engagement with the flange 12 as the cover is in process of rotation prior to reaching said operative position.

An upwardly projecting stem 19, fastened to the center of the cover 14 as at 20, is slidably and rotatably confined and guided in a socket 21 at the base of a ferrule 22 secured to and extending axially upwardly from a rigid overhead supporting member 23 adapted to be arranged in a stationary position across the receptacle opening. The ends 24 of the member 23 are adapted to engage sockets or seats 25 formed in handle members 26 fastened as at 27 to brackets 28 welded to diametrically opposite upper side wall portions of the receptacle. As shown in the drawings, the handle members 26 are preferably arranged in alignment with the widest axis of the receptacle opening. The ferrule 22 and socket 21 occupy a position midway between the ends 24 of the member 23, and the seats 25 with which the ends 24 cooperate to retain the member 23 in stationary position on the receptacle, are at equal distances from the edge 13 defining the opening in the top of the receptacle. Consequently when the member 23 is operatively seated the stem 19 is guided by the socket 21 to restrict rotation of the cover about an axis coincident with the center of the receptacle opening defined by the edge 13.

The upper end of the stem 19 is provided with an operating knob preferably in the form of an inverted metal cap 29 having its outer surface enclosed within a shell 30 of suitable heat insulating material, such as Bakelite, which is secured to the stem 19 by means of a screw 31. The cap 29 is conveniently joined to the stem 19 by having the edges of an opening in its base crimped to the upper end of the stem as shown in Figs. 4 and 5.

Figure 4:
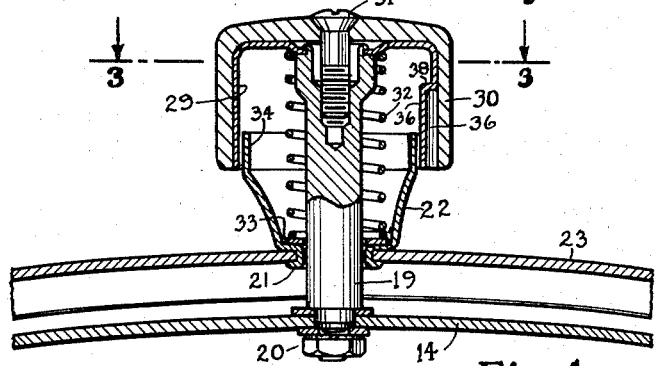
Fig. 4 is an enlarged vertical section taken on line 4—4 of Fig. 3.
Figure 5:
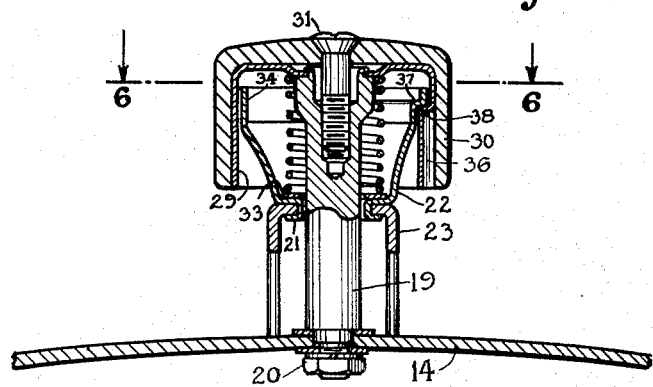
Fig. 5 is an enlarged section taken on line 5—5 of Fig. 6, illustrating the cover and associated parts in condition to be removed from or applied to the receptacle.

As will be observed in Figs. 4 and 5, the dimensions of the peripheral skirt portion of the operating knob cap 29 is such that it overlaps the cylindrical upper peripheral edge portion 34 of the ferrule 22 when the cover 14 is in operative or initial spaced position relative to the member 23 or in depressed or advanced spaced position. Thus the hollow portion of ferrule 22 is concealed from view by the operating knob in either position of adjustment of the latter.

The portion of the stem 19 located above the socket 21 is embraced by a coil spring 32. One end of the spring 32 bears against the base of the metal cap 29 and the opposite end of the spring reacts against a ring 33 coacting with the base of the ferrule 22 adjoining the socket 21. This spring functions to force the supporting member 23 and the cover 14 in a direction toward each other to assume an initial spaced position as clearly shown in Fig. 4. Accordingly, when the supporting member 23 is operatively positioned across the receptacle opening, and the rim of the cover 14 is in operative engagement with the flange 12 surrounding the receptacle opening, as shown in Fig. 2, the pressure of the spring 32 actually maintains the cover in such operative position. The rim of the cover 14 is accordingly movable downwardly away from operative position by pressure applied upon the operating knob to depress the stem 19 against the resistance of the spring 32.

Figure 3:
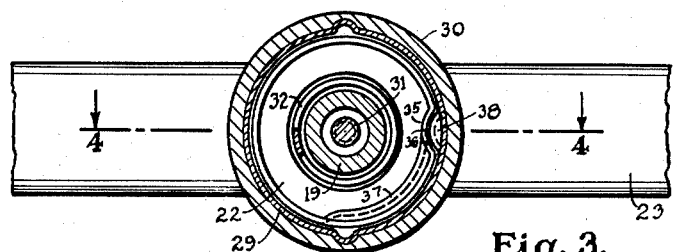
Fig. 3 is an enlarged view with parts in section taken on line 3—3 of Fig. 4.
Figure 6:
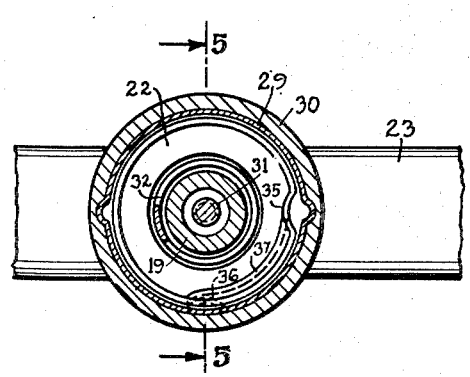
Fig. 6 is an enlarged vertical section taken on line 6—6 of Fig. 5.
Figure 7:
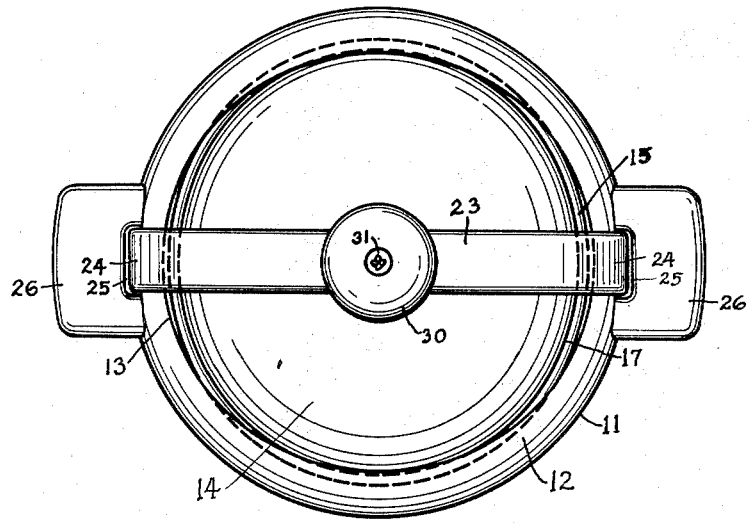
Fig. 7 is a top plan view similar to Fig. 1 but showing the cover and associated parts in a position within the receptacle turned about its upright axis through an angle of 90 degrees relative to the position shown in Fig. 1.
Figure 8:
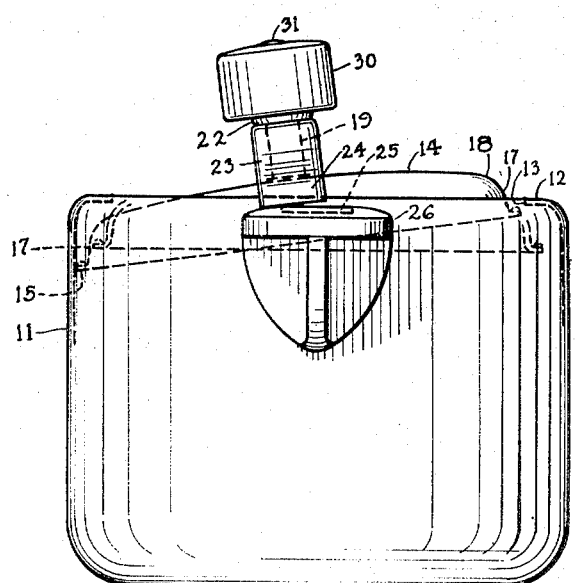
Fig. 8 is a side elevation showing the cover and associated parts in position assumed thereby when in process of movement toward and away from an operative position within the receptacle.

The cylindrical portion 34 of the ferrule 22 is formed with an axial depression 35 which is adapted to provide clearance for an axial projection 36 on the inner surface of the cap 29 as the operating knob is depressed into the position shown in Fig. 5. A horizontal shoulder 37 formed in the cylindrical portion 34 of the ferrule 22 and extending circumferentially from the lower limits of the depression 35 through an arc of approximately 90 degrees is engageable by a shoulder at the upper limits of the projection 36 in the cap 29 to lock the operating knob in depressed position as in Fig. 5 and to limit angular displacement of the cap 29 relative to the ferrule 22 within a range of 90 degrees as shown in Figs. 3 and 6. The pressure of the spring 32 is sufficient to maintain a frictional lock between the shoulder 37 in the ferrule and the projection 36 on the cap of operating knob. Thus by depressing the operating knob and turning the same through an arc of 90 degrees so as to lock the knob in depressed position as shown in Fig. 5, the stem 19 and cover 14 may be moved from an initial rotated position as shown in Fig. 2 into an advanced rotated position shown in Fig. 7, wherein the cover is arranged lengthwise of its longest dimension at right angles to the widest part of the receptacle opening. When thus positioned, the cover 14 may be tilted and lifted from the receptacle lengthwise of its longest axis as shown in Fig. 8, during which operation the ends 24 of the supporting member 23 are removed from the seats 25.

When it is desired to again apply the cover to the receptacle, the operation of removing the cover as described above is merely reversed. After the cover has been introduced as shown in Fig. 8 and finally arranged so that the ends of the supporting member 23 are disposed in the seats 25, the operating knob is rotated to place the projection 36 in a position cooperating with the depression 35 in the ferrule 22, whereupon the spring 32 forces the stem 19 and cover 14 upwardly until the rim of the cover is locked in sealed position against the flange 12.

The cover may also be provided with suitable vent valves and gauges of usual construction (not shown).

It should be understood that it is not desired to limit the invention to the exact details of construction herein shown and described, for various modifications within the scope of the claims may occur to persons skilled in the art.

I claim:

1. In a pressure cooker comprising a receptacle having an elliptical top opening and a cover with the cover engageable with the underside of the margin of said opening and movable therethrough when tilted and rotated 90 out of alignment with the opening, means for effecting rotation of the cover into alignment with the opening and movement thereof upwardly into sealing engagement with said margin, said means comprising a vertical stem fixed for rotation with and projecting from the cover, a bridge member adapted to rest on the receptacle and rotatably and slidably supporting said stem, a locking element fixed to said bridge member, a manually rotatable element connected to said stem for rotating said cover relative to said bridge member and movable by rotation in one direction into locking engagement with said locking element to hold the cover in a remote position from said bridge member and by rotation in the opposite direction out of such locking engagement to free the cover for movement toward said bridge member, and spring means urging said cover toward said bridge member and into engagement with the margin of said opening when said rotatable element is out of locking engagement with said locking element.

2. In a pressure cooker comprising a receptacle having an elliptical top opening and a cover with the cover engageable with the underside of the margin of said opening and insertable therethrough when tilted and rotated 90° out of alignment with the opening, means for effecting rotation of the cover into and out of alignment with the opening and movement thereof upwardly into sealing engagement with said margin when aligned with said cover, said means comprising a bridge member adapted to rest on the receptacle and supporting said cover for rotation and vertical movement relative thereto, a manually operable element connected to said cover for rotating said cover relative to said bridge member and for moving said cover to a position remote from said bridge member, spring means tending to move said cover toward said bridge member and into engagement with the margin of said opening, and a pair of locking elements, one on said bridge member and the other movable with said manually operable element, said locking elements being engageable in locking relation, when the cover is in said remote position, by rotation of said manually operable element to move the cover out of alignment with said opening, whereby said cover is held in said remote position.

3. In a pressure cooker comprising a receptacle having an elliptical top opening and a cover with the cover engageable with the underside of the margin of said opening and insertable therethrough when tilted and rotated 90° out of alignment with the opening, means for effecting rotation of the cover into alignment with the opening and movement thereof upwardly into sealing engagement with said margin, said means comprising means adapted to engage the receptacle and supporting said cover for rotation and vertical movement relative thereto, a manually operable element connected to said cover for rotating said cover and for moving said cover to a position remote from said receptacle engaging means, spring means tending to move said cover toward the latter means and into engagement with the margin of said opening, and a pair of locking elements, one on said receptacle engaging means and the other movable with said manually operable element, said locking elements being rotatably engageable in locking relation, when the cover is in said remote position, by the rotation of the manually operable element which moves the cover out of alignment with said opening, and said locking elements, when said cover is in alignment with said opening and is moved from said remote position, holding said cover in such alignment.

4. A pressure cooker comprising a receptacle having an elliptical top opening, a cover engageable with the underside of the margin of said opening and insertable therethrough when tilted and rotated 90° out of alignment with the opening, means adapted to engage the receptacle and supporting the cover for rotation and vertical movement relative to the receptacle, a manually operable element carrying said cover and rotatable and vertically movable with said cover, said element being adapted by rotation in one direction to rotate said cover out of alignment with the opening and by rotation in the opposite direction to rotate said cover into alignment with said opening and by downward movement to move the cover to a position remote from said receptacle engaging means, a spring tending to move said cover into engagement with the margin of said opening, and a pair of locking elements, one on said receptacle engaging means and comprising a horizontal extending ledge having a vertically opening notch at one end and the other comprising a vertically elongated lug movable with said manually operable element, said ledge and said lug being engageable, when the cover is in said remote position, by rotation of said manually operable element in said one direction to hold the cover in said remote position against the action of said spring, and said lug and said notch coacting to hold the cover in alignment with said opening when the cover is moved from said remote position by said spring.

5. In a pressure cooker comprising a receptacle having an elliptical top opening and a cover with the cover engageable with the underside of the margin of said opening and insertable therethrough when tilted and rotated 90° out of alignment with the opening, means for effecting rotation of the cover into alignment with the opening and movement thereof upwardly into sealing engagement with said margin, said means comprising a bridge member adapted to rest on the receptacle and supporting said cover for rotation and vertical movement relative thereto, a manually operable element located above said bridge member and connected to said cover for rotating said cover relative to said bridge member and for moving said cover downwardly to a position remote from said bridge member, a spring tending to move said cover upwardly toward said bridge member and into engagement with the margin of said opening and bearing at one end against said bridge member and at its other end against said manually operable member, and a pair of locking elements, one on said bridge member and the other movable with said manually operable member, for holding said cover in said remote position when rotated out of alignment with said opening against the action of said spring and for preventing rotation of said cover when in alignment with said opening and moved upwardly from said remote position by said spring.

6. In a pressure cooker comprising a receptacle having an elliptical top opening and a cover with the cover engageable with the underside of the margin of said opening and movable therethrough when tilted and rotated 90° out of alignment with the opening, means for effecting rotation of the cover into alignment with the opening and movement thereof upwardly into sealing engagement with said margin, said means comprising a vertical stem projecting upwardly from the cover, a bridge member adapted to rest on the receptacle and rotatably and slidably supporting said stem, a manually operable element located above said bridge member and connected to said stem for rotating said cover relative to said bridge member and for moving said cover downwardly to a position remote from said bridge member, a coiled compression spring surrounding said stem for moving said cover upwardly toward said bridge member and into engagement with the margin of said opening when aligned therewith, said spring being supported at its lower end by said bridge member and bearing at its upper end against said manually operable element, and a pair of locking elements, one on said bridge member and the other movable with said manually operable member, for holding said cover in said remote position when out of alignment with said opening and for preventing rotation of said cover when in alignment with said opening and moved upwardly from said remote position.

7. In a pressure cooker comprising a receptacle having an elliptical top opening and a cover with the cover engageable with the underside of the margin of said opening and insertable therethrough when tilted and rotated 90° out of alignment with the opening, means for effecting rotation of the cover into alignment with the opening and movement thereof upwardly into sealing engagement with said margin, said means comprising a bridge member adapted to rest on the receptacle and supporting said cover for rotation and vertical movement relative thereto, a fixed element mounted on said bridge member and having a horizontal locking surface with a notch at one end thereof, a manually operable element connected to said cover for rotating said cover relative to said bridge member and having an elongated lug engageable with said surface on said fixed element, said manually operable element when depressed to move the cover to a position remote from said bridge member being rotatable in one direction to move the cover out of alignment with said opening and to move said lug into locking engagement with said locking surface to hold the cover in said remote position, and a spring for moving said cover toward said bridge member and into engagement with the margin of said opening when said lug is in alignment with said notch.

8. In a pressure cooker comprising a receptacle having an elliptical top opening and a cover with the cover engageable with the underside of the margin of said opening and movable therethrough when tilted and rotated 90° out of alignment with the opening, means for effecting rotation of the cover into alignment with the opening and movement thereof upwardly into sealing engagement with said margin, said means comprising a vertical stem projecting upwardly from the cover, a bridge member adapted to rest on the receptacle and rotatably and slidably supporting said stem, a cup-shaped locking element fixed to said bridge member and having a downwardly facing locking surface in its side with an upwardly opening notch at one end, an inverted cup-shaped manually operable member telescoping over said locking element and connected to said stem for rotating said cover relative to said bridge member and for moving said cover downwardly and having an elongated lug engageable with said surface, said manually operable member being rotatable in one direction to move the cover out of alignment with said opening and to move said lug into engagement with said locking surface to hold the cover in a lowered position relative to the bridge member, a coiled compression spring surrounding said stem within said elements and urging said cover upwardly toward said bridge member and into engagement with the margin of said opening when said lug is released from said locking surface and in alignment with said notch and said cover is in alignment with said opening.

MYRON J. ZIMMER.

REFERENCES CITED

The following references are of record in the file of this patent:

UNITED STATES PATENTS

| Number | Name | Date |
| --- | --- | --- |
| 1,085,965 | Brown | Feb. 3, 1914 |
| 1,759,732 | Charlot | May 20, 1930 |
| 2,093,624 | Thwaits et al. | Sep. 21, 1937 |
| 2,134,985 | Parrott | Nov. 1, 1938 |
| 2,188,735 | Grundstrom | Jan. 30, 1940 |
| 2,416,637 | Minella, Jr. | Feb. 25, 1947 |

FOREIGN PATENTS

| Number | Country | Date |
| --- | --- | --- |
| 639,195 | France | June 15, 1928 |
| 259,702 | Italy | Aug. 2, 1928 |